United States Patent
Park et al.

(10) Patent No.: US 11,518,426 B2
(45) Date of Patent: Dec. 6, 2022

(54) FOLDABLE STEERING SYSTEM FOR VEHICLE

(71) Applicants: Hyundai Motor Company, Seoul (KR); Kia Corporation, Seoul (KR)

(72) Inventors: Jung Woo Park, Seoul (KR); Jin Ho Bae, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/484,272

(22) Filed: Sep. 24, 2021

(65) Prior Publication Data

US 2022/0274639 A1     Sep. 1, 2022

(30) Foreign Application Priority Data

Feb. 26, 2021   (KR) ......................... 10-2021-0026102

(51) Int. Cl.
| | |
|---|---|
| *B62D 1/185* | (2006.01) |
| *B62D 1/20* | (2006.01) |
| *B62D 1/183* | (2006.01) |
| *B62D 1/181* | (2006.01) |

(52) U.S. Cl.
CPC ............ *B62D 1/185* (2013.01); *B62D 1/181* (2013.01); *B62D 1/183* (2013.01); *B62D 1/20* (2013.01)

(58) Field of Classification Search
CPC ........ B62D 1/185; B62D 1/181; B62D 1/183; B62D 1/20
See application file for complete search history.

(56) References Cited

U.S. PATENT DOCUMENTS

| | | | | |
|---|---|---|---|---|
| 2021/0124349 A1* | 4/2021 | Koehler | ................. | B62D 1/185 |
| 2021/0323598 A1* | 10/2021 | Watanabe | .............. | B62D 1/195 |
| 2021/0354744 A1* | 11/2021 | Choi | ..................... | B60W 10/20 |

FOREIGN PATENT DOCUMENTS

| | | | | |
|---|---|---|---|---|
| CN | 108482476 A | * | 9/2018 | ............. B62D 1/181 |
| DE | 102019209680 A1 | * | 1/2020 | |
| WO | WO-2022084508 A1 | * | 4/2022 | |

* cited by examiner

*Primary Examiner* — Drew J Brown
(74) *Attorney, Agent, or Firm* — Morgan, Lewis & Bockius LLP

(57) ABSTRACT

A foldable steering system for a vehicle may maximize spatial utilization of a driver seat by performing a fold-in operation in which a steering wheel, a steering shaft, shrouds, and the like are accommodated in a crash pad when an autonomous driving mode, a stopping mode, or a getting-in/out mode, in which a driver need not directly manipulate the steering wheel, is selected as a driving mode of an autonomous vehicle and configured for ensuring convenience of use and safety of the steering wheel by performing a fold-out operation in which the steering wheel, the steering shaft, the shrouds, and the like extend from an interior of the crash pad toward the driver seat when the driving mode of the autonomous vehicle is switched to a manual driving mode, an autonomous driving fail mode, and an active safety mode for coping with collision avoidance impossibility.

19 Claims, 8 Drawing Sheets

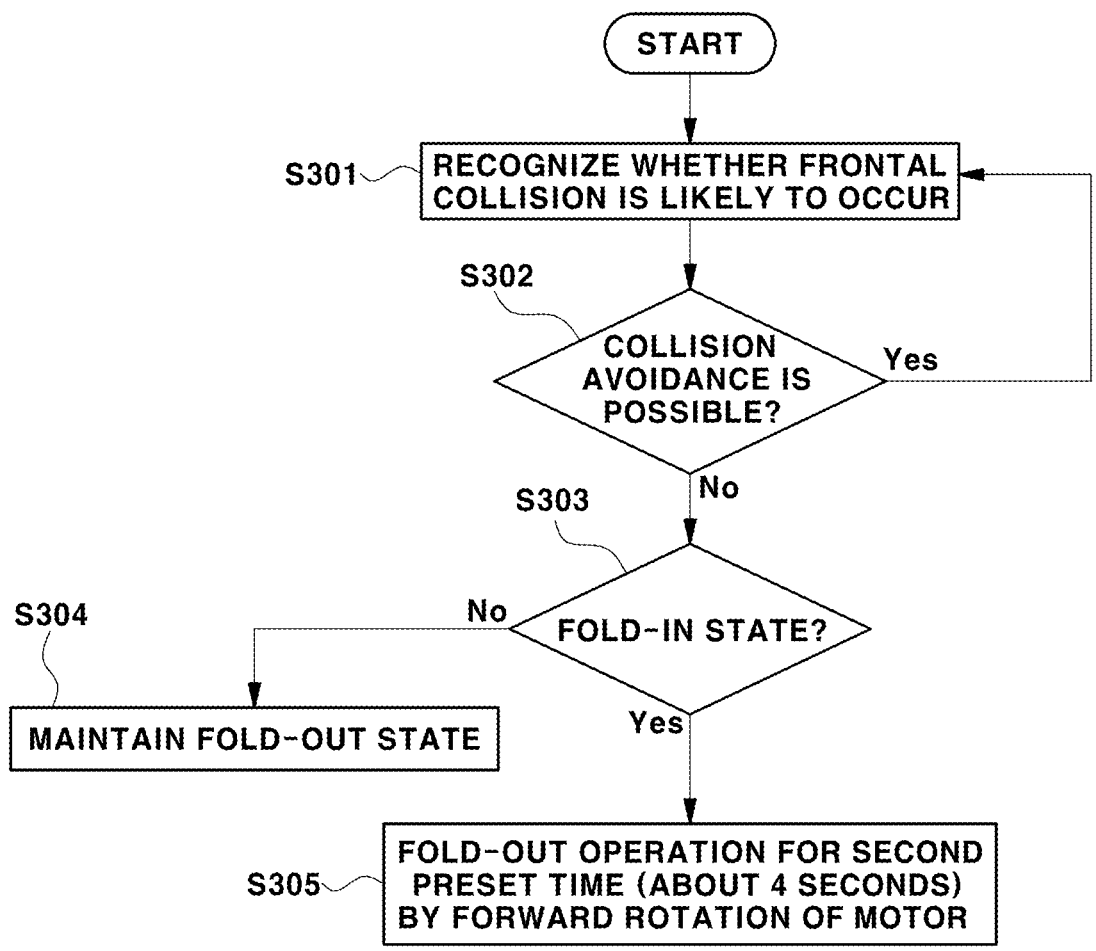

FOLDABLE STEERING SYSTEM FOR VEHICLE

CROSS-REFERENCE TO RELATED APPLICATION

The present application claims priority to Korean Patent Application No. 10-2021-0026102 filed on Feb. 26, 2021, the entire contents of which is incorporated herein for all purposes by this reference.

BACKGROUND OF THE INVENTION

Field of the Invention

The present invention relates to a foldable steering system for a vehicle, and to a foldable steering system for a vehicle, which is configured for accommodating a steering wheel, a steering shaft, a shroud, and the like in a crash pad to maximize spatial utilization of an interior of an autonomous vehicle.

Description of Related Art

In general, a steering wheel used for a driver to steer a vehicle is disposed on a crash pad disposed in front of a driver seat of the vehicle, a steering shaft is connected to the steering wheel, and a steering tube is coupled to an external diameter portion of the steering shaft.

Furthermore, a steering column housing is tiltably mounted on the crash pad, and the steering shaft and the steering tube are retractably inserted and disposed in the steering column housing.

Therefore, when the steering column housing is tilted in an upward/downward direction thereof, a vertical angle of the steering wheel may be adjusted to a level desired by the driver. When the steering shaft and the steering tube are inserted into the steering column housing or retracted from the steering column housing, a forward/rearward length of the steering wheel may be adjusted to a level desired by the driver.

However, there is a problem in that spatial utilization of a driver seat deteriorates due to the steering wheel when an autonomous driving mode or a stopping mode, in which the driver need not directly manipulate the steering wheel, is selected as a driving mode of the autonomous vehicle.

For example, because the steering wheel protrudes toward the driver seat and occupies a part of a space of the driver seat, there is a problem in that spatial utilization for providing the driver with a space for reading, viewing multimedia contents, sleeping, and the like deteriorates.

When the driver seat is swiveled, the steering wheel causes interference, which makes it difficult to ensure a swivel trajectory of the driver seat.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a foldable steering system for a vehicle, which is configured for maximizing spatial utilization of a driver seat by performing a fold-in operation in which a steering wheel, a steering shaft, a shroud, and the like are accommodated in the crash pad when an autonomous driving mode, a stopping mode, or a getting-in/out mode, in which a driver need not directly manipulate the steering wheel, is selected as a driving mode of an autonomous vehicle.

Various aspects of the present invention are directed to providing a foldable steering system for a vehicle, which is configured for ensuring convenience of use and safety of a steering wheel by performing a fold-out operation in which the steering wheel, a steering shaft, a shroud, and the like are extended from an interior of a crash pad toward a driver seat when a driving mode of an autonomous vehicle is switched to a manual driving mode in which a driver directly manipulates the steering wheel, an autonomous driving fail mode, and an active safety mode for coping with collision avoidance incapability.

Various aspects of the present invention provide a foldable steering system for a vehicle, the foldable steering system including: a steering tube connected to a steering wheel by a steering shaft; a steering column housing mounted in a crash pad so that the steering tube is extendably inserted into the steering column housing; a motor mounted on an external diameter portion of the steering column housing; a lead screw fixedly connected to an output shaft of the motor; a lead nut into which the lead screw is rotatably inserted; a folding bracket fixed to the lead nut; a gear train mounted on the folding bracket, the steering tube, and the steering column housing and configured to form a forward/rearward movement distance of the steering tube longer than a forward/rearward movement distance of the lead nut and folding bracket; and a control device electrically connected to the motor and configured to control an operation of a motor control device electrically connected to the motor and to control an operation of the motor according to each driving mode.

In various aspects of the present invention, the foldable steering system may further include telescopic shrouds connected to a rear surface of the steering wheel and a front end portion of the steering column housing to cover both the steering shaft and the steering tube, in which the telescopic shrouds are deployed when the steering shaft and the steering tube move in a first direction, and the telescopic shrouds overlap one another when the steering shaft and the steering tube move in a second direction opposite to the first direction thereof.

In various aspects of the present invention, the shrouds may include: a first shroud fastened to a steering roll connector mounted on the rear surface of the steering wheel; a third shroud fastened to the front end portion of the steering column housing by a connection bracket; and a second shroud sized to be inserted into the third shroud and sized to allow the first shroud to be inserted into the second shroud so that the second shroud is slidably connected to the first shroud and the third shroud.

In various exemplary embodiments of the present invention, the gear train may include: a moving rack gear mounted on the steering tube; a stationary rack gear mounted on the steering column housing; and a rotation gear rotatably and axially provided on the folding bracket connected to the lead nut, the rotation gear being configured to engage with both the moving rack gear and the stationary rack gear.

In various exemplary embodiments of the present invention, the forward/rearward movement distance of the steering tube may be set to be equal to or longer than twice the forward/rearward movement distance of the lead nut and folding bracket.

In still various exemplary embodiments of the present invention, the control device may include: an assisted and automated driving control unit (ADCU) configured to provide current driving mode information of an autonomous vehicle; a motor control unit (MCU) electrically connected to the motor and configured to provide a power-on signal or a power-off signal for the motor; an airbag control unit (ACU) configured to provide a vehicle-collision-avoidance-impossibility signal; a steering control module (SCM) electrically connected to the ADCU, the MCU and ACU and configured to control a rotation direction of the motor and electric current application to the motor based on the driving mode information, the power-on signal, the power-off signal, and the collision-avoidance-impossibility signal; and a driver manipulation switch connected to the SCM and configured to provide a fold-in signal to the SCM.

In a further exemplary embodiment of the present invention, when the SCM receives an autonomous driving mode, as a current driving mode, from the ADCU, the SCM performs electric current control to rotate the motor reversely to move and accommodate, for a first preset time, the steering shaft and the steering tube in the steering column housing.

In another further exemplary embodiment of the present invention, when the SCM receives the fold-in signal from the driver manipulation switch, the SCM may determine that a current condition is a parking-stopping condition, and the SCM may perform electric current control to rotate the motor reversely to move and accommodate, for the first preset time, the steering shaft and the steering tube in the steering column housing.

In yet another further exemplary embodiment of the present invention, when the SCM receives the motor-power-off signal from the MCU, the SCM may determine that a current condition is a getting-in/out condition, and the SCM may perform electric current control to rotate the motor reversely to move and accommodate, for the first preset time, the steering shaft and the steering tube in the steering column housing.

In yet another further exemplary embodiment of the present invention, when the SCM receives a manual driving mode, as a current driving mode, from the ADCU, the SCM may perform electric current control to rotate the motor forward to extend, for a first preset time, the steering shaft and the steering tube, which are accommodated in the steering column housing, to a predetermined position so that a driver directly manipulates the steering wheel.

In still yet another further exemplary embodiment of the present invention, when the SCM receives the motor-power-on signal from the MCU, the SCM may determine that a current condition of the vehicle is a vehicle starting condition, and the SCM may perform electric current control to rotate the motor forward to extend, for the first preset time, the steering shaft and the steering tube, which are accommodated in the steering column housing, to a predetermined position so that a driver directly manipulates the steering wheel.

In a still further exemplary embodiment of the present invention, when the SCM receives an autonomous driving fail mode, as a current driving mode, from the ADCU, the SCM may perform electric current control to rotate the motor forward to extend, within a second preset time shorter than the first preset time, the steering shaft and the steering tube, which are accommodated in the steering column housing, to a predetermined position so that a driver directly manipulates the steering wheel.

In a yet further exemplary embodiment of the present invention, when the SCM receives the collision-avoidance-impossibility signal from the ACU, the SCM may perform electric current control to rotate the motor forward to extend, within a third preset time shorter than the second preset time, the steering shaft and the steering tube, which are accommodated in the steering column housing, to a predetermined position so that a driver directly manipulates the steering wheel.

In a still yet further exemplary embodiment of the present invention, a receiving space into which the steering wheel is inserted and accommodated may be formed in a front surface of the crash pad.

Various aspects of the present invention provide the following effects through the above-mentioned solutions.

First, in the case of the autonomous driving mode, the stopping mode, and the getting-in/out mode in which the driver need not directly manipulate the steering wheel, the fold-in operation is performed such that the steering wheel, the steering shaft, the shrouds, and the like are accommodated in the crash pad. As a result, it is possible to maximize spatial utilization of the driver seat by widening the space thereof.

Second, when the vehicle starts or when the vehicle operates in the manual driving mode, the fold-out operation is performed such that the steering wheel, the steering shaft, the shrouds, and the like are extended from the interior of the crash pad to the position at which the driver may manipulate the steering wheel. As a result, it is possible to provide the driver with convenience of use of the steering wheel.

Third, in the case of the autonomous driving fail mode, the fold-out operation is performed such that the steering wheel, the steering shaft, the shrouds, and the like are rapidly extended to the position at which the driver may manipulate the steering wheel. As a result, it is possible to implement safe driving by allowing the driver to rapidly steer the vehicle by operating the steering wheel.

Fourth, in the case of the active safety mode for coping with the collision avoidance impossibility, the fold-out operation is performed such that the steering wheel mounted with the airbag is more rapidly extended to the position at which the airbag is appropriately deployed toward the driver. As a result, it is possible to easily protect the driver by appropriate deploying the airbag.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9, FIG. 10 and FIG. 11 are flowcharts illustrating operational examples of the foldable steering system for a vehicle according to various exemplary embodiments of the present invention.

Figure 1:
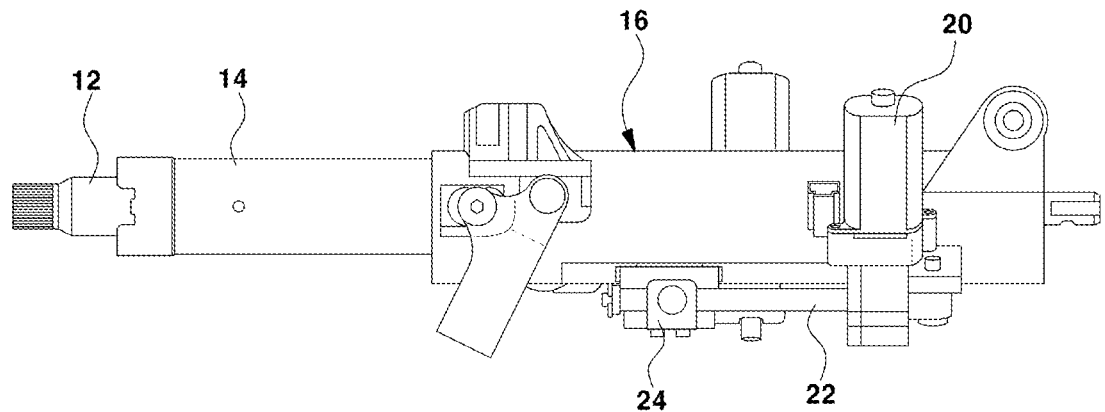
FIG. 1 is a side view exemplarily illustrating a foldable steering system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, of the present invention an exemplary embodiment of the present invention will be described in detail with reference to the accompanying drawings.

Figure 2:
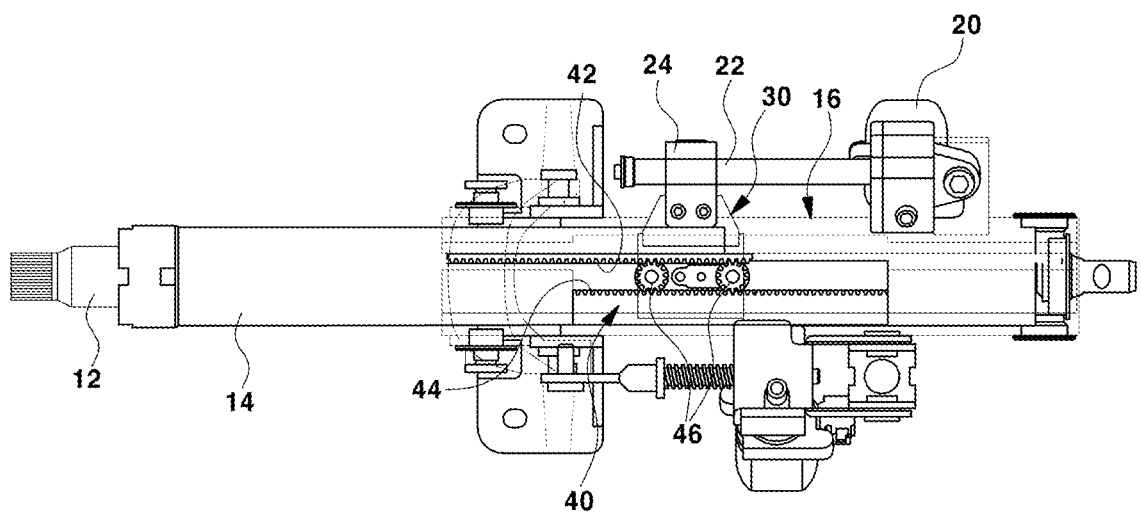
FIG. 2 and FIG. 3 are bottom plan views exemplarily illustrating a gear train of the foldable steering system for a vehicle according to various exemplary embodiments of the present invention.
Figure 3:
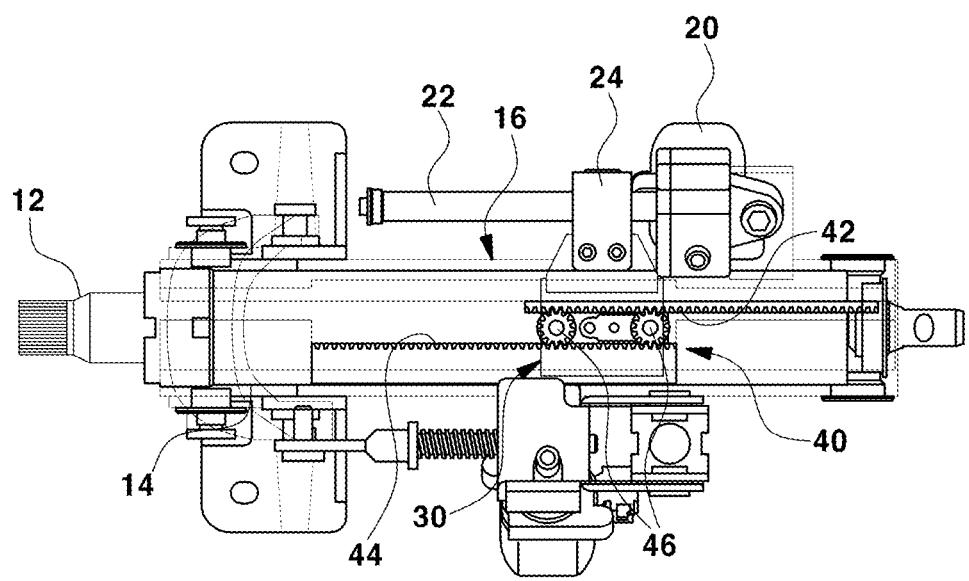

FIG. 1 is a side view exemplarily illustrating a foldable steering system for a vehicle according to various exemplary embodiments of the present invention, FIG. 2 is a view exemplarily illustrating a fold-out state in which a steering tube is moved toward a driver seat at a rear side by a gear train of the foldable steering system according to various exemplary embodiments of the present invention, and FIG. 3 is a view exemplarily illustrating a fold-in state in which the steering tube is moved into a steering column housing at a front side by the gear train of the foldable steering system according to various exemplary embodiments of the present invention.

As illustrated in FIG. 1 and FIG. 2, the foldable steering system includes a steering shaft 12 connected to a steering wheel, a steering tube 14 into which the steering shaft 12 is inserted and fastened, a steering column housing 16 mounted in a crash pad so that the steering tube 14 is extendably inserted into the steering column housing 16.

A motor 20 is mounted at a predetermined position on an external diameter portion of the steering column housing 16. A lead screw 22 is connected to an output shaft of the motor 20 to be rotatable in place, and the lead screw 22 is disposed in parallel with a longitudinal direction of the steering column housing 16.

A lead nut 24 is fastened to the lead screw 22, and a folding bracket 30 is mounted on an internal end portion of the lead nut 24.

Therefore, when the lead screw 22 is rotated in place by operation of the motor 20, the lead nut 24 and the folding bracket 30 rectilinearly move together in a forward/rearward direction thereof.

A gear train 40 is mounted in the folding bracket 30, the steering tube 14, and the steering column housing 16, and the gear train 40 is configured to make a forward/rearward movement distance of the steering tube 14 longer than a forward/rearward movement distance of the lead nut 24 and the folding bracket 30.

To the present end, the gear train 40 may include a moving rack gear 42 mounted in the longitudinal direction on an external surface of the steering tube 14, a stationary rack gear 44 mounted in the longitudinal direction on an internal surface of the steering column housing 16, and a rotation gear 46 rotatably and axially provided on the folding bracket 30 and configured to engage with both the moving rack gear 42 and the stationary rack gear 44.

When the lead nut 24 and the folding bracket 30 rectilinearly move toward the driver seat at the rear side as the lead screw 22 is rotated forward in place by a forward rotation of the motor 20, the rotation gear 46 moves along the stationary rack gear 44 while rotating in one direction and simultaneously pushes the moving rack gear 42 toward the driver seat at the rear side.

Therefore, as illustrated in FIG. 2, a fold-out operation is performed such that the steering tube 14 and the steering shaft 12, on which the moving rack gear 42 is mounted, rectilinearly move toward the driver seat at the rear side and the steering wheel fastened to the steering shaft 12 is placed at a position at which a driver may directly manipulate the steering wheel 10.

In contrast, when the lead nut 24 and the folding bracket 30 rectilinearly move forward as the lead screw 22 is rotated reversely in place by a reverse rotation of the motor 20, the rotation gear 46 moves along the stationary rack gear 44 while rotating in the other direction and simultaneously pulls the moving rack gear 42 forward thereof.

Therefore, as illustrated in FIG. 3, a fold-in operation is performed such that the steering tube 14, on which the moving rack gear 42 is mounted, is inserted and accommodated into the steering column housing 16 at the front side thereof.

Based on the operation of the gear train 40, the forward/rearward movement distance (about 150 mm) of the steering tube 14 may be set to be twice or more the forward/rearward movement distance (about 75 mm) of the lead nut 24 and the folding bracket 30.

Figure 7:
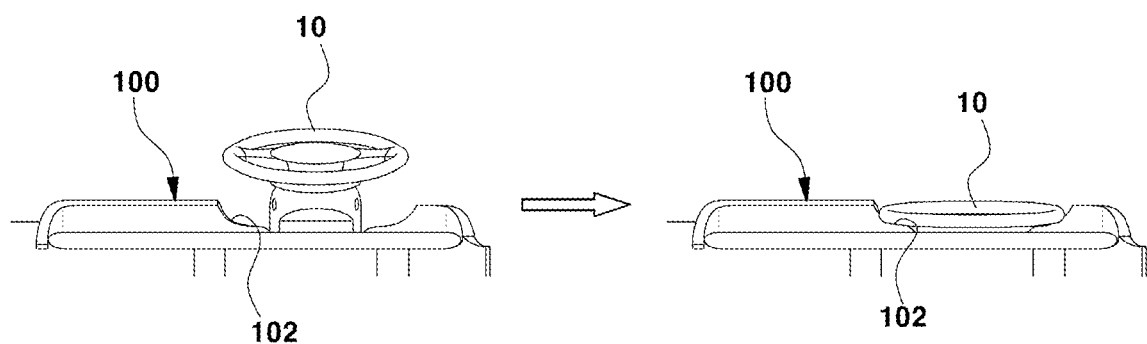
FIG. 7 is a schematic top plan view exemplarily illustrating a state in which a steering wheel is accommodated in a crash pad by the foldable steering system for a vehicle according to various exemplary embodiments of the present invention.

Therefore, when the steering tube 14 is maximally moved forward and inserted and accommodated into the steering column housing 16 at the front side, the steering shaft 12 is also maximally moved forward, and the steering wheel 10 connected to the steering shaft 12 is also inserted and accommodated into a receiving space 102 formed in a front surface of a crash pad 100, as illustrated in FIG. 7.

A space of the driver seat is widened when the steering tube 14 is maximally moved forward and inserted and accommodated into the steering column housing 16 at the front side and the steering wheel 10 is also moved forward and accommodated in the receiving space 102 of the crash pad 100 as described above. As a result, it is possible to maximize spatial utilization of the driver seat by providing the driver with the space for reading, viewing multimedia contents, sleeping, and the like, and it is possible to easily ensure a swivel trajectory of the driver seat by preventing the driver seat from interfering with the steering wheel when the driver seat is swiveled.

Meanwhile, because the steering shaft 12 and the steering tube 14 are driving components, it is necessary to prevent the steering shaft 12 and the steering tube 14 from coming into contact with the driver's body and to protect the steering shaft 12 and the steering tube 14 from external force and foreign substances.

To the present end, the steering shaft 12 and the steering tube 14 are covered by shrouds disposed between the crash pad 100 and the steering wheel 10 so that external appearances of the steering shaft 12 and the steering tube 14 are not visible.

Figure 4:
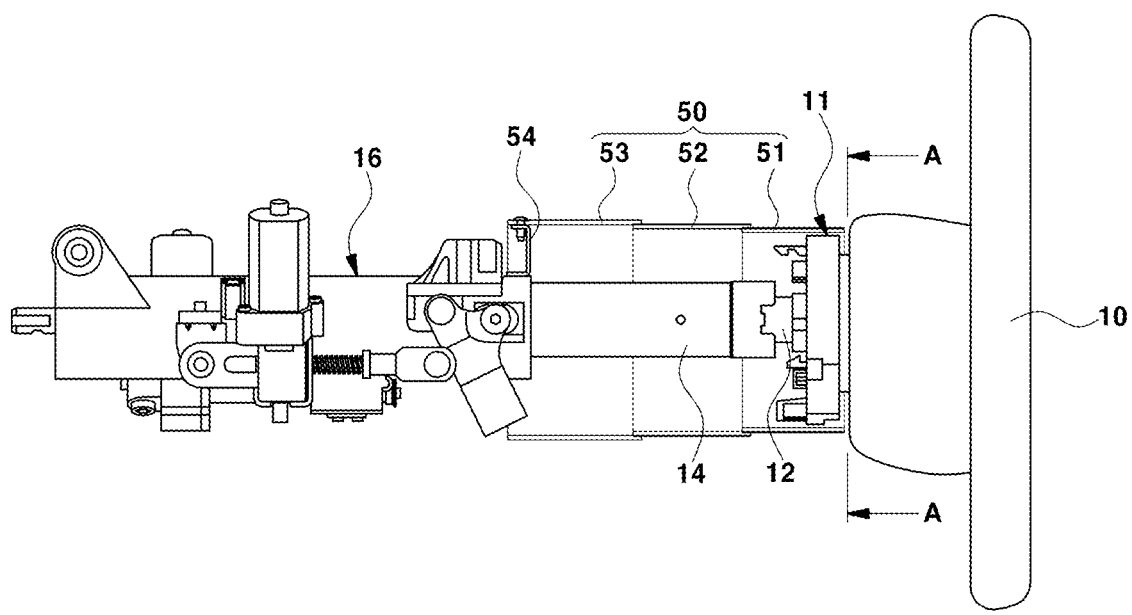
FIG. 4 is a side view exemplarily illustrating a state in which shrouds of the foldable steering system for a vehicle according to various exemplary embodiments of the present invention are deployed.

However, because the shrouds may interfere with the forward movement of the steering tube 14 and the steering wheel 10, telescopic shrouds 50 are mounted between a rear surface of the steering wheel 10 and a front end portion of the steering column housing 16 to avoid the interference, as illustrated in FIG. 4.

The telescopic shrouds 50 are structured to cover the steering shaft 12 and the steering tube 14 and configured to be deployed when the steering shaft 12 and the steering tube 14 move rearward or to overlap one another when the steering shaft 12 and the steering tube 14 move forward thereof.

In more detail, as illustrated in FIG. 4, the shrouds 50 may include a first shroud 51 fastened to a steering roll connector 11 mounted on the rear surface of the steering wheel 10, a third shroud 53 fastened to the front end portion of the steering column housing 16, and a second shroud 52 sized to be inserted into the third shroud 53 and sized to allow the first shroud 51 to be inserted into the second shroud 52, and the second shroud 52 is slidably connected to the first shroud 51 and the third shroud 53.

Figure 5:
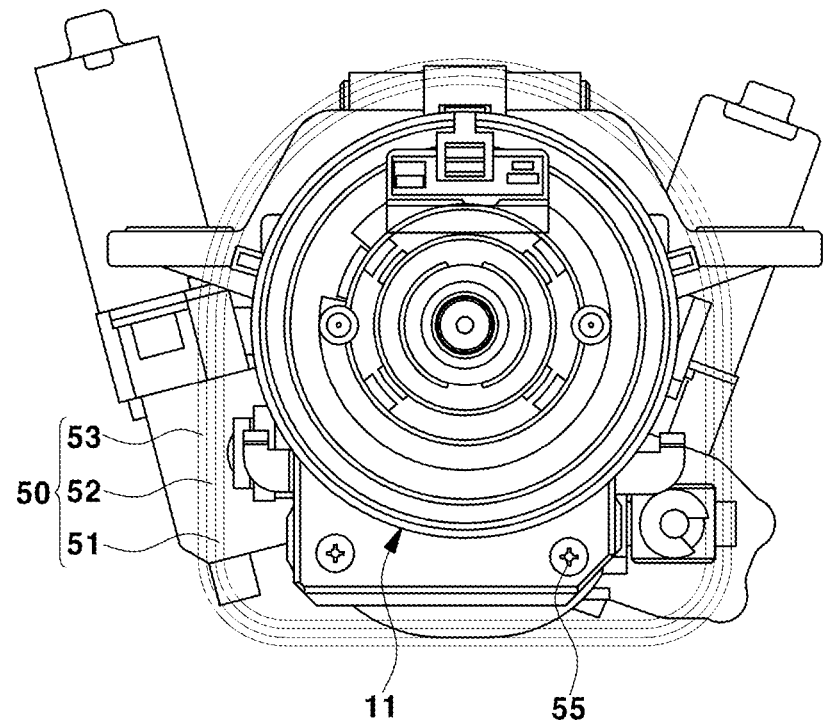
FIG. 5 is a cross-sectional view taken along line A-A in FIG. 4.

In the instant case, as illustrated in FIG. 5, the first shroud 51 may be fastened and fixed to a front end portion of the steering roll connector 11 by screws 55. As illustrated in FIG. 4, the third shroud 53 may be fastened and fixed to the front end portion of the steering column housing 16 by a separate connection bracket 54.

For reference, the steering roll connector 11 is a component configured to transmit an electrical signal to components such as an airbag and a remote controller provided on the steering wheel 10.

Figure 6:
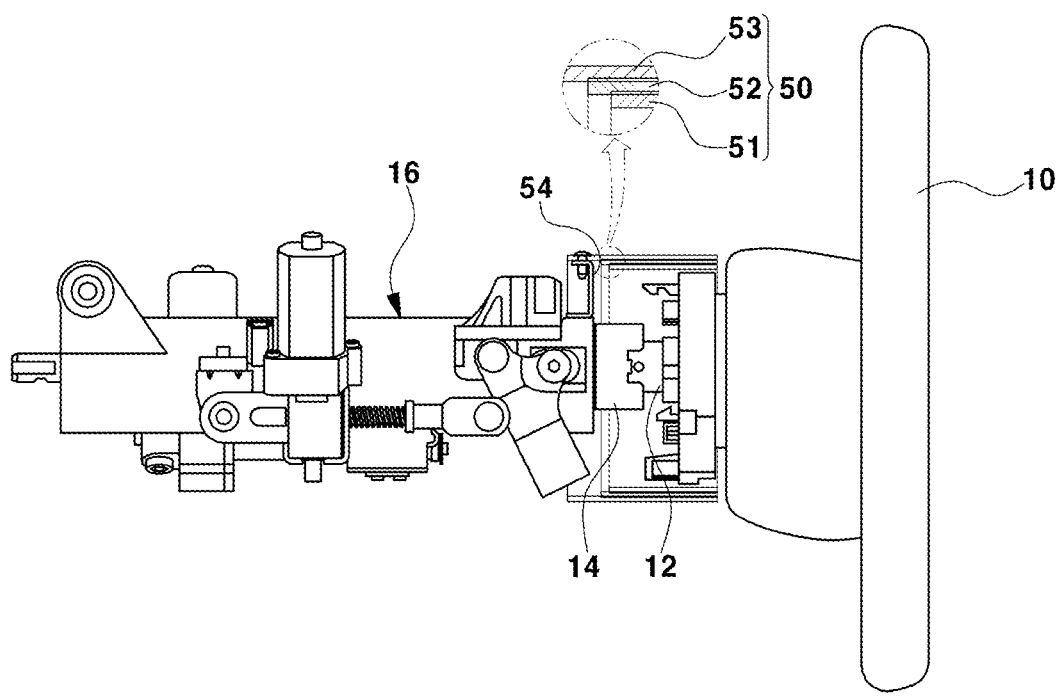
FIG. 6 is a side view exemplarily illustrating a state in which the shrouds of the foldable steering system for a vehicle according to various exemplary embodiments of the present invention overlap one another.

Therefore, as illustrated in FIG. 6, when the steering wheel 10 and the steering tube 14 move forward, the first shroud 51 is inserted into the second shroud 52 and overlaps the second shroud 52, and continuously, the second shroud 52 is inserted into the third shroud 53 and overlaps the third shroud 53 such that the steering wheel 10 and the steering tube 14 may be easily inserted and accommodated into the steering column housing 16 at the front side.

In contrast, when the steering wheel 10 and the steering tube 14 move toward the driver seat at the rear side, the second shroud 52 is extended from the third shroud 53, and continuously, the first shroud 51 is extended from the second shroud 52 such that the first, second, and third shrouds 51, 52, and 53 are deployed when the steering wheel 10 and the steering tube 14 completely move to the driver seat at the rear side, as illustrated in FIG. 4.

Meanwhile, an operation of controlling the entire foldable steering system according to various exemplary embodiments of the present invention may be performed by a single integrated control device configured to control the operation of the motor 20 for each driving mode or by a control device made by combining multiple controllers.

Figure 8:
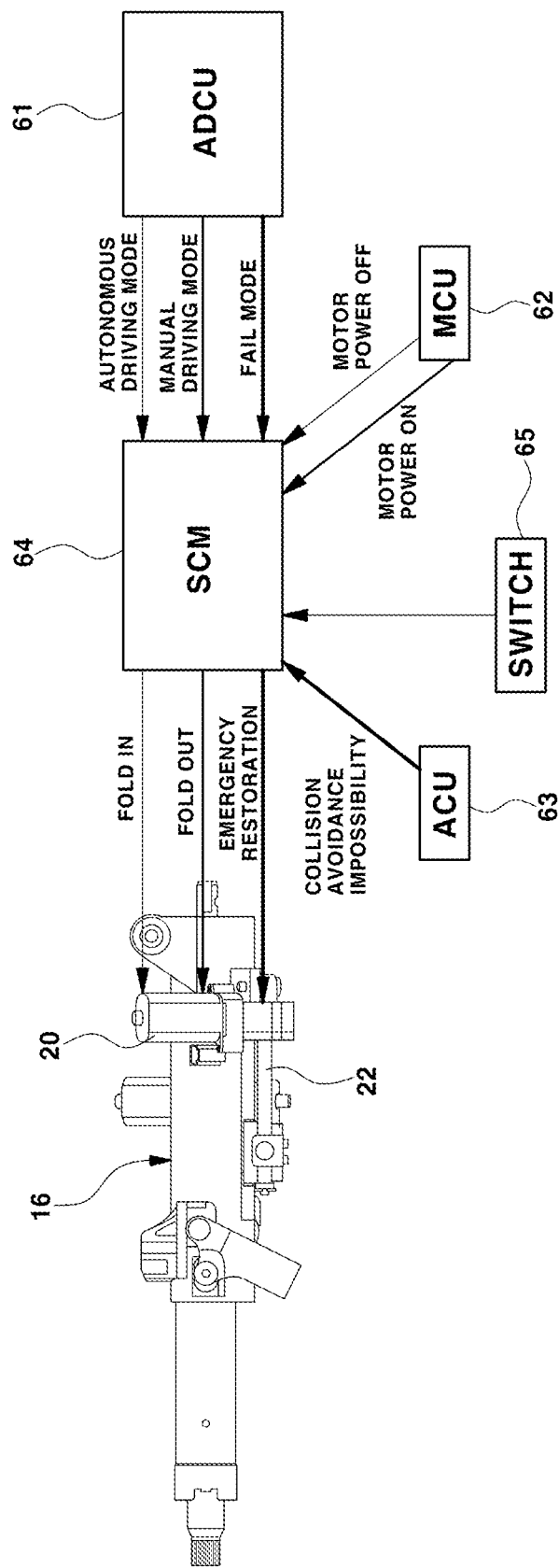
FIG. 8 is a view exemplarily illustrating a configuration of a control device of the foldable steering system for a vehicle according to various exemplary embodiments of the present invention.

To the present end, as illustrated in FIG. 8, the control device 60 may include an assisted and automated driving control unit (ADCU) 61 configured to provide a steering control module (SCM) 64 with current driving mode information of an autonomous vehicle, a motor control unit (MCU) 62 configured to provide the SCM 64 with a power-on signal or a power-off signal for the motor, an airbag control unit (ACU) 63 configured to provide the SCM 64 with a vehicle-collision-avoidance-impossibility signal, the SCM 64 configured to control a rotation direction of the motor and electric current application to the motor based on the driving mode information, the power-on/off signal, and the collision-avoidance-impossibility signal, and a driver manipulation switch 65 configured to provide the SCM 64 with a fold-in signal.

In the instant case, an operational flow and a control operation of the foldable steering system according to various exemplary embodiments of the present invention will be described below.

Figure 9:
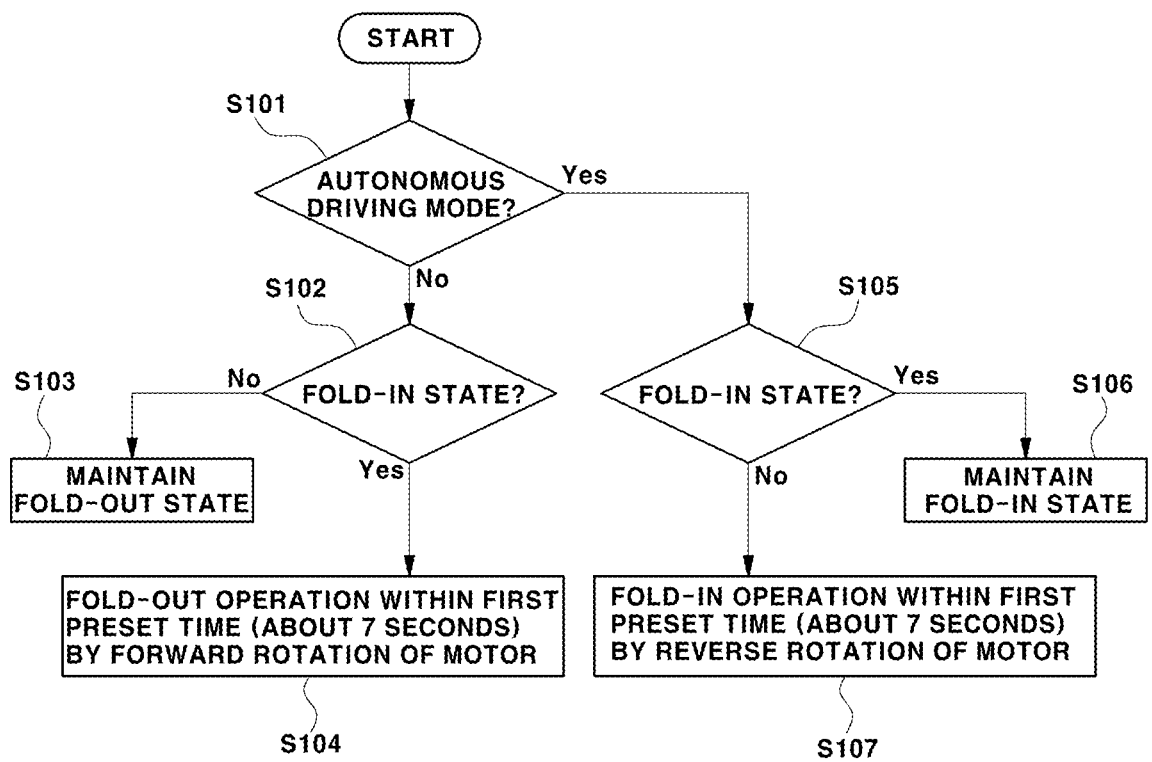

FIG. 9 is a flowchart illustrating an operational flow of the foldable steering system for a vehicle according to various exemplary embodiments of the present invention in an autonomous driving mode and a manual driving mode.

To implement the operational flow illustrated in FIG. 9, when the SCM 64 receives, from the ADCU 61, the manual driving mode as the current driving mode, the SCM 64 performs pulse width modulation (PWM) electric current application control to rotate the motor 20 forward to extend, for a first preset time (about 7 seconds), the steering shaft 12 and the steering tube 14, which are accommodated in the steering column housing 16, to a position at which the driver directly manipulates the steering wheel 10.

Alternatively, when the SCM 64 receives, from the ADCU 61, the autonomous driving mode, as a current driving mode, the SCM 64 performs the PWM electric current application control to rotate the motor 20 reversely to move and accommodate, for the first preset time (about 7 seconds), the steering shaft 12 and the steering tube 14 in the steering column housing 16.

To the present end, first, the SCM 64 determines which one of the driving modes is the current driving mode (S101).

When the determination result indicates that the current driving mode is the manual driving mode, the SCM 64 determines whether the current state is the fold-in state (S102).

That is, the SCM 64 identifies whether the current state is the fold-in state or the fold-out state, the fold-in state indicating a state in which the steering tube 14 is inserted and accommodated into the steering column housing 16 and the steering wheel 10 is also accommodated in the receiving space 102 formed in the front surface of the crash pad 100 as illustrated in FIG. 7, the fold-out state indicating a state in which the steering tube 14 is rectilinearly moved toward the driver seat at the rear side and the steering wheel 10 is placed at the position at which the driver may directly manipulate the steering wheel 10.

When the identification result indicates that the current state is the fold-in state, the SCM 64 performs the electric current application control to rotate the motor 20 forward such that the fold-out operation is performed within the first preset time (about 7 seconds) (S104).

In more detail, as described above with reference to FIG. 2, the fold-out operation is performed within the first preset time (about 7 seconds) such that, as the lead screw 22 is rotated forward in place by the forward rotation of the motor 20, the lead nut 24 and the folding bracket 30 are rectilinearly moved toward the driver seat at the rear side, and the rotation gear 46 moves along the stationary rack gear 44 while rotating in one direction and simultaneously pushes the moving rack gear 42 toward the driver seat at the rear side such that the steering tube 14 and the steering shaft 12, on which the moving rack gear 42 is mounted, rectilinearly move toward the driver seat at the rear side and the steering wheel 10 is placed at the position at which the driver may directly manipulate the steering wheel 10.

In the instant case, when the identification result in step S102 indicates that the current state is the fold-out state, the SCM 64 maintains the current state as it is (S103).

Therefore, in the manual driving mode, the manual driving may be performed in which the driver directly manipulates the steering wheel.

When the SCM 64 receives a motor-power-on signal from the MCU 62, the SCM 64 determines that the current condition is a vehicle starting condition, and the SCM 64 performs the electric current application control to rotate the motor 20 forward to extend, within the first preset time, the steering tube 14, which is accommodated in the steering column housing 16, to the position at which the driver directly manipulates the steering wheel 10 such that the fold-out operation may be performed. As a result, the manual driving, in which the driver directly manipulates the steering wheel, may be performed when the vehicle starts.

In contrast, when the determination result in step S101 indicates that the current driving mode is the autonomous driving mode, the SCM 64 identifies whether the current state is the fold-in state (S105).

When the identification result indicates that the current state is the fold-out state, the SCM 64 performs the electric current application control to rotate the motor 20 reversely such that the fold-in operation is performed within the first preset time (about 7 seconds) (S107).

In more detail, as described above with reference to FIG. 3, the fold-in operation is performed within the first preset time (about 7 seconds) such that, as the lead screw 22 is rotated reversely in place by the reverse rotation of the motor 20, the lead nut 24 and the folding bracket 30 are rectilinearly moved forward, and the rotation gear 46 moves along the stationary rack gear 44 while rotating in the other direction and simultaneously pulls the moving rack gear 42 forward such that the steering tube 14 having the moving rack gear 42 mounted thereon is inserted and accommodated into the steering column housing 16 at the front side and simultaneously the steering wheel 10 is inserted and accommodated into the receiving space 102 formed in the front surface of the crash pad 100.

Therefore, the space of the driver seat is widened in the autonomous driving mode, and as a result, it is possible to maximize spatial utilization of the driver seat by providing the driver with the space for reading, viewing multimedia contents, sleeping, and the like, and it is possible to easily ensure the swivel trajectory of the driver seat by preventing the driver seat from interfering with the steering wheel when the driver seat is swiveled.

For reference, the SCM may identify the fold-in state and the fold-out state based on the amount of forward or reverse rotation of the motor or using a signal of a position sensor configured to detect a position of the steering tube.

When the SCM 64 receives the fold-in signal from the separate driver manipulation switch 65, the SCM 64 determines that the current condition is a parking-stopping condition, and the SCM 64 performs the electric current application control to rotate the motor 20 reversely to move and accommodate, for the first preset time, the steering shaft 12 and the steering tube 14 in the steering column housing 16 such that the fold-in operation may be performed. As a result, the wide space of the driver seat may be used even in the parking-stopping state of the vehicle.

Alternatively, when the SCM 64 receives a motor-power-off signal from the MCU 62, the SCM 64 determines that the current condition is a getting-in/out condition, and the SCM 64 performs the electric current application control to rotate the motor 20 reversely to move and accommodate, for the first preset time, the steering shaft 12 and the steering tube 14 in the steering column housing 16 such that the fold-in operation may be performed. As a result, it is possible to improve getting-in/out convenience by ensuring a wide passageway space for allowing the driver to get in or out of the vehicle.

Figure 10:
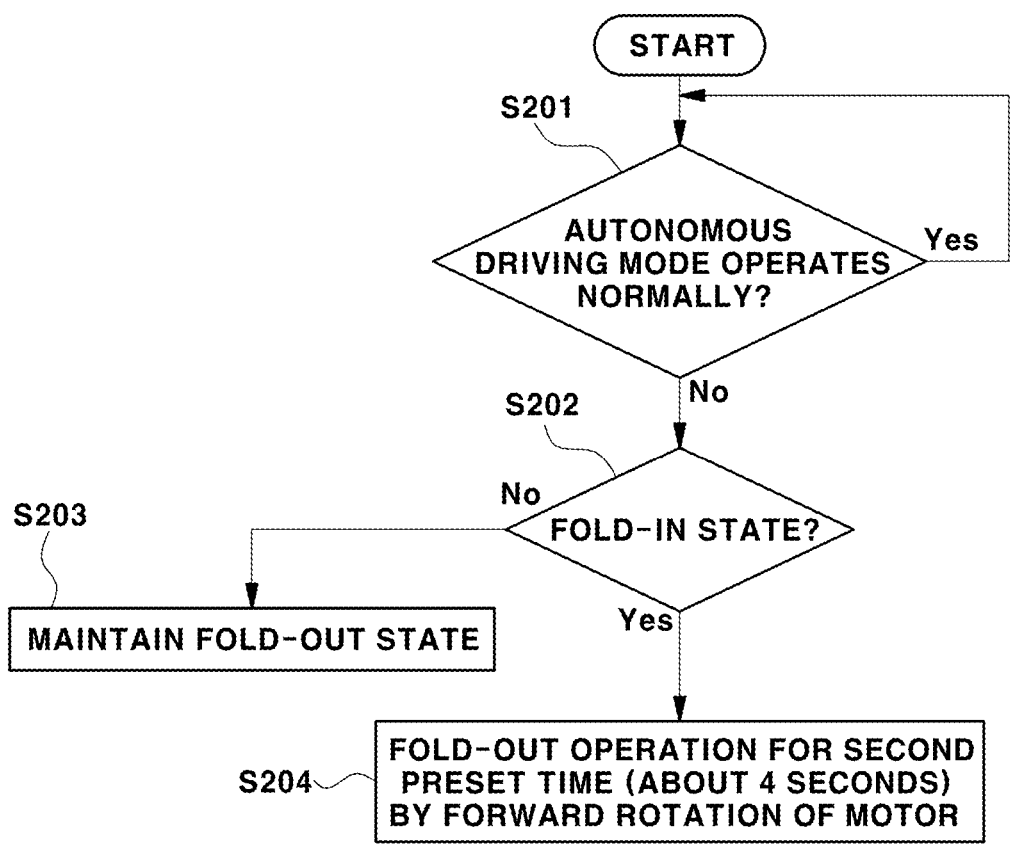

FIG. 10 is a flowchart illustrating an operational flow of the foldable steering system for a vehicle according to various exemplary embodiments of the present invention in an autonomous driving fail mode.

To implement the operational flow illustrated in FIG. 10, when the SCM 64 receives the autonomous driving fail mode, as a current driving mode, from the ADCU 61, the SCM 64 performs the PWM electric current application control to rotate the motor 20 forward to extend, within a second preset time (about 4 seconds) shorter than the first preset time, the steering shaft 12 and the steering tube 14, which are accommodated in the steering column housing 16, to the position at which the driver directly manipulates the steering wheel 10.

To the present end, first, the SCM 64 determines whether the autonomous driving mode operates normally (S201).

For example, when the SCM 64 receives the autonomous driving fail mode, as a current driving mode, from the ADCU 61, the SCM 64 determines that the autonomous driving mode does not operate normally.

When the determination result indicates that the autonomous driving mode does not operate normally, the SCM 64 identifies whether the current state is the fold-in state (S202).

That is, the SCM 64 identifies whether the current state is the fold-in state or the fold-out state, the fold-in state indicating a state in which the steering tube 14 is inserted and accommodated into the steering column housing 16 and the steering wheel 10 is also accommodated in the receiving space 102 formed in the front surface of the crash pad 100 as illustrated in FIG. 7, the fold-out state indicating a state in which the steering tube 14 is rectilinearly moved toward the driver seat at the rear side and the steering wheel 10 is placed at the position at which the driver may directly manipulate the steering wheel 10.

When the identification result indicates that the current state is the fold-in state, the SCM 64 performs the electric current application control to rotate the motor 20 forward such that the fold-out operation is performed within the second preset time (about 4 seconds) (S204).

In the instant case, the fold-out operation may be performed within the second preset time (about 4 seconds) by increasing the electric current to be applied during the PWM electric current application control for rotating the motor 20 forward thereof.

In more detail, as described above with reference to FIG. 2, the fold-out operation is performed within the second preset time (about 4 seconds) such that, as the lead screw 22 is rotated forward in place by the forward rotation of the motor 20, the lead nut 24 and the folding bracket 30 are rectilinearly moved toward the driver seat at the rear side, and the rotation gear 46 moves along the stationary rack gear 44 while rotating in one direction and simultaneously pushes the moving rack gear 42 toward the driver seat at the rear side such that the steering tube 14 and the steering shaft 12, on which the moving rack gear 42 is mounted, rectilinearly move toward the driver seat at the rear side and the steering wheel 10 is placed at the position at which the driver may directly manipulate the steering wheel 10.

In the instant case, when the identification result in step S202 indicates that the current state is the fold-out state, the SCM 64 maintains the current state as it is (S203).

Therefore, in the autonomous driving fail mode, the manual driving may be rapidly performed in which the driver directly manipulates the steering wheel.

FIG. 11 is a flowchart illustrating an operational flow of the foldable steering system for a vehicle according to various exemplary embodiments of the present invention in an active safety mode for coping with collision avoidance impossibility.

To implement the operational flow illustrated in FIG. 11, when the SCM 64 receives a collision-avoidance-impossibility signal (e.g., a collision signal for deploying an airbag) from the ACU 63, the SCM 64 performs the PWM electric current application control to rotate the motor 20 forward to extend, within a third preset time (about 2 seconds) shorter than the second preset time, the steering shaft 12 and the steering tube 14, which are accommodated in the steering column housing 16, to the position at which the driver directly manipulates the steering wheel 10.

To the present end, first, the ACU 63 recognizes whether the frontal collision may occur, according to a signal of a collision detection sensor (S301).

Next, the SCM 64 determines whether collision avoidance is possible (S302).

For example, when the SCM 64 receives the collision-avoidance-impossibility signal (e.g., the collision signal for deploying the airbag) from the ACU 63, the SCM 64 determines that the collision avoidance is impossible.

When the determination result indicates that the collision avoidance is impossible, the SCM 64 identifies whether the current state is the fold-in state (S303).

That is, the SCM 64 identifies whether the current state is the fold-in state or the fold-out state, the fold-in state indicating a state in which the steering tube 14 is inserted and accommodated into the steering column housing 16 and the steering wheel 10 is also accommodated in the receiving space 102 formed in the front surface of the crash pad 100 as illustrated in FIG. 7, the fold-out state indicating a state in which the steering tube 14 is rectilinearly moved toward the driver seat at the rear side and the steering wheel 10 is placed at the position at which the driver may directly manipulate the steering wheel 10.

When the identification result indicates that the current state is the fold-in state, the SCM 64 performs the electric current application control to rotate the motor 20 forward such that the fold-out operation is performed within the third preset time (about 2 seconds) (S305).

In the instant case, the fold-out operation may be performed within the third preset time (about 2 seconds) by further increasing the electric current to be applied during the PWM electric current application control for rotating the motor 20 forward thereof.

In more detail, as described above with reference to FIG. 2, the fold-out operation is performed within the third preset time (about 2 seconds) such that as the lead screw 22 is rotated forward in place by the forward rotation of the motor 20, the lead nut 24 and the folding bracket 30 are rectilinearly moved toward the driver seat at the rear side, and the rotation gear 46 moves along the stationary rack gear 44 while rotating in one direction and simultaneously pushes the moving rack gear 42 toward the driver seat at the rear side such that the steering tube 14 and the steering shaft 12, on which the moving rack gear 42 is mounted, rectilinearly move toward the driver seat at the rear side and the steering wheel 10 is placed at the position at which the driver may directly manipulate the steering wheel 10.

In the instant case, when the identification result in step S303 indicates that the current state is the fold-out state, the SCM 64 maintains the current state as it is (S304).

Therefore, when the vehicle collision avoidance is impossible, the steering wheel 10 may be rapidly moved, within the third preset time, to the position at which the driver may directly manipulate the steering wheel 10 and the airbag mounted in the steering wheel 10 may be easily deployed toward the driver, easily preventing an injury to the driver caused by the deployment of the airbag.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable steering system for a vehicle, the foldable steering system comprising:
    a steering tube connected to a steering wheel by a steering shaft;
    a steering column housing mounted in a crash pad, wherein the steering tube is extendably inserted into the steering column housing;
    a motor mounted on an external circumference of the steering column housing;
    a lead screw fixedly connected to an output shaft of the motor;
    a lead nut into which the lead screw is rotatably inserted;
    a folding bracket fixed to the lead nut;
    a gear train mounted on the folding bracket, the steering tube, and the steering column housing and configured to make a movement distance of the steering tube longer than a movement distance of the lead nut and folding bracket; and
    a control device electrically connected to the motor and configured to control an operation of a motor control device electrically connected to the motor and to control an operation of the motor according to each driving mode.

2. The foldable steering system of claim 1, further including:
    telescopic shrouds connected to a rear surface of the steering wheel and a front end portion of the steering column housing to cover the steering shaft and the steering tube,
    wherein the telescopic shrouds are deployed when the steering shaft and the steering tube move in a first direction, and the telescopic shrouds overlap one another when the steering shaft and the steering tube move in a second direction opposite to the first direction.

3. The foldable steering system of claim 2, wherein the shrouds include:
    a first shroud fastened to a steering roll connector mounted on the rear surface of the steering wheel;
    a third shroud fastened to the front end portion of the steering column housing by a connection bracket; and
    a second shroud sized to be inserted into the third shroud and sized to allow the first shroud to be inserted into the second shroud so that the second shroud is slidably connected to the first shroud and the third shroud.

4. The foldable steering system of claim 1, wherein the gear train includes:
    a moving rack gear mounted on the steering tube;
    a stationary rack gear mounted on the steering column housing; and
    a rotation gear rotatably provided on the folding bracket connected to the lead nut and gear-engaged with the moving rack gear and the stationary rack gear.

5. The foldable steering system of claim 4, wherein the movement distance of the steering tube is set to be equal to or longer than twice the movement distance of the lead nut and folding bracket.

6. The foldable steering system of claim 1, wherein the control device includes:
    an assisted and automated driving control unit (ADCU) configured to provide current driving mode information of an autonomous vehicle;
    a motor control unit (MCU) electrically connected to the motor and configured to provide a power-on signal or a power-off signal for the motor;
    an airbag control unit (ACU) configured to provide a vehicle-collision-avoidance-incapability signal;
    a steering control module (SCM) electrically connected to the ADCU, the MCU and ACU and configured to control a rotation direction of the motor and electric current application to the motor according to the current driving mode information, the power-on signal, the power-off signal, and the collision-avoidance-impossibility signal; and
    a driver manipulation switch connected to the SCM and configured to provide a fold-in signal to the SCM.

7. The foldable steering system of claim 6,
    wherein each driving mode includes an autonomous driving mode, and
    wherein when the SCM receives the autonomous driving mode, as a current driving mode, from the ADCU, the SCM is configured to control the motor to rotate reversely to move and accommodate, for a first preset time, the steering shaft and the steering tube in the steering column housing.

8. The foldable steering system of claim 6, wherein when the SCM receives the fold-in signal from the driver manipulation switch, the SCM is configured to determine that a current condition of the vehicle is a parking-stopping condition, and the SCM is configured to control the motor to rotate reversely to move and accommodate, for a first preset time, the steering shaft and the steering tube in the steering column housing.

9. The foldable steering system of claim 6, wherein when the SCM receives the power-off signal from the MCU, the SCM is configured to determine that a current condition of the vehicle is a getting-in/out condition, and the SCM is configured to control the motor to rotate reversely to move and accommodate, for a first preset time, the steering shaft and the steering tube in the steering column housing.

10. The foldable steering system of claim 6,
   wherein each driving mode includes a manual driving mode, and
   wherein when the SCM receives the manual driving mode, as a current driving mode, from the ADCU, the SCM is configured to control the motor to rotate forward to extend, for a first preset time, the steering shaft and the steering tube, which are accommodated in the steering column housing, to a predetermined position so that a driver directly manipulates the steering wheel.

11. The foldable steering system of claim 6, wherein when the SCM receives the power-on signal from the MCU, the SCM is configured to determine that a current condition of the vehicle is a vehicle starting condition, and the SCM is configured to control the motor to rotate forward to extend, for a first preset time, the steering shaft and the steering tube, which are accommodated in the steering column housing, to a predetermined position so that a driver directly manipulates the steering wheel.

12. The foldable steering system of claim 6,
   wherein each driving mode includes an autonomous driving fail mode, and
   wherein when the SCM receives the autonomous driving fail mode, as a current driving mode, from the ADCU, the SCM is configured to control the motor to rotate forward to extend, within a second preset time shorter than a first preset time, the steering shaft and the steering tube, which are accommodated in the steering column housing, to a predetermined position so that a driver directly manipulates the steering wheel.

13. The foldable steering system of claim 6, wherein when the SCM receives a collision-avoidance-impossibility signal from the ACU, the SCM is configured to control the motor to rotate forward to extend, within a third preset time shorter than a second preset time, the steering shaft and the steering tube, which are accommodated in the steering column housing, to a predetermined position so that a driver directly manipulates the steering wheel.

14. The foldable steering system of claim 1, wherein a receiving space into which the steering wheel is inserted and accommodated is formed in a front surface of the crash pad.

15. A method of controlling a foldable steering system having a motor, a steering tube and a steering column housing into which the steering tube is extendably inserted into and movable with respect to the steering column housing by the motor, according to each driving mode including an autonomous driving mode, a manual driving mode and an autonomous driving fail mode, the method comprising:
   when the controller determines that a current driving mode of a vehicle is the autonomous driving mode, controlling, by a controller electrically connected to the motor, the motor to rotate reversely to move and accommodate, for a first preset time, the steering tube in the steering column housing,
   when the controller determines that the current driving mode is the manual driving mode, controlling, by the controller, the motor to rotate forward to extend, for the first preset time, the steering tube which is accommodated in the steering column housing, to a predetermined first position so that a driver directly manipulates a steering wheel, and
   when the controller determines that the current driving mode is the autonomous driving fail mode, controlling, by the controller, the motor to rotate forward to extend, within a second preset time shorter than the first preset time, the steering tube which is accommodated in the steering column housing, to a predetermined second position so that the driver directly manipulates the steering wheel.

16. The method of claim 15, further including:
   when the controller receives a fold-in signal, controlling, by the controller, the motor to rotate reversely to move and accommodate, for the first preset time, the steering tube in the steering column housing.

17. The method of claim 15, further including:
   when the controller receives a power-off signal for the motor, controlling, by the controller, the motor to rotate reversely to move and accommodate, for the first preset time, the steering tube in the steering column housing.

18. The method of claim 15, wherein when the controller determines that a current condition of a vehicle is a vehicle starting condition, controlling, by the controller, to rotate forward to extend, for the first preset time, the steering tube which is accommodated in the steering column housing, to a predetermined position so that a driver directly manipulates the steering wheel.

19. The foldable steering system of claim 15, further including:
   when the controller receives a collision-avoidance-impossibility signal, controlling, by the controller, to rotate the motor forward to extend, within a third preset time shorter than the second preset time, the steering tube which is accommodated in the steering column housing, to a predetermined position so that a driver directly manipulates the steering wheel.

* * * * *